United States Patent
Icarre et al.

(10) Patent No.: US 7,038,342 B2
(45) Date of Patent: May 2, 2006

(54) FAN MOTOR SUPPORT

(75) Inventors: Eric Icarre, Bressolles (FR); Xavier Girod, Montluel (FR)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 10/950,246

(22) Filed: Sep. 24, 2004

(65) Prior Publication Data

US 2006/0066165 A1    Mar. 30, 2006

(51) Int. Cl.
*H02K 5/00*    (2006.01)

(52) U.S. Cl. .......................... 310/91; 310/51; 248/637; 248/674

(58) Field of Classification Search .................. 310/91; 248/674–675
See application file for complete search history.

(56) References Cited

U.S. PATENT DOCUMENTS

| 1,739,082 | A | * | 12/1929 | Simmons et al. | ........... 454/346 |
|---|---|---|---|---|---|
| 2,020,532 | A | * | 11/1935 | Young | ........... 165/67 |
| 2,557,223 | A | * | 6/1951 | Hans | ........... 417/423.15 |
| 3,790,114 | A | * | 2/1974 | Italiano et al. | ........... 248/675 |
| 4,076,197 | A | * | 2/1978 | Dochterman | ........... 248/604 |
| 4,171,937 | A | * | 10/1979 | Greenfield | ........... 417/423.15 |
| 4,257,554 | A | * | 3/1981 | Willingham | ........... 236/35 |
| 4,394,111 | A | * | 7/1983 | Wiese et al. | ........... 417/360 |
| 4,514,105 | A | * | 4/1985 | Adams et al. | ........... 403/24 |
| 4,515,538 | A | * | 5/1985 | Shih | ........... 417/572 |
| 4,920,696 | A | * | 5/1990 | Mawby et al. | ........... 312/404 |
| 5,332,188 | A | * | 7/1994 | Davis et al. | ........... 248/674 |
| 5,417,401 | A | * | 5/1995 | Thompson et al. | ........... 248/674 |
| 5,696,416 | A | * | 12/1997 | Baker et al. | ........... 310/91 |
| 5,853,159 | A | * | 12/1998 | Gorini et al. | ........... 248/674 |

FOREIGN PATENT DOCUMENTS

JP          62-085651    *    4/1987    ........... 310/91

* cited by examiner

*Primary Examiner*—Burton Mullins
(74) *Attorney, Agent, or Firm*—Bachman & LaPointe, P.C.

(57) ABSTRACT

A fan motor support bracket has a central body portion and first and second end portions upwardly offset from the central body portion. First and second transition portions extend respectively between the first and second end portion and first and second ends of the central body portion. The central body portion has a base and first and second sidewalls extending generally upward from the base. The first sidewall has at least one relief for accommodating a mounting ear of the motor.

16 Claims, 3 Drawing Sheets

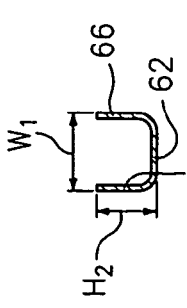
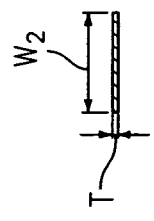
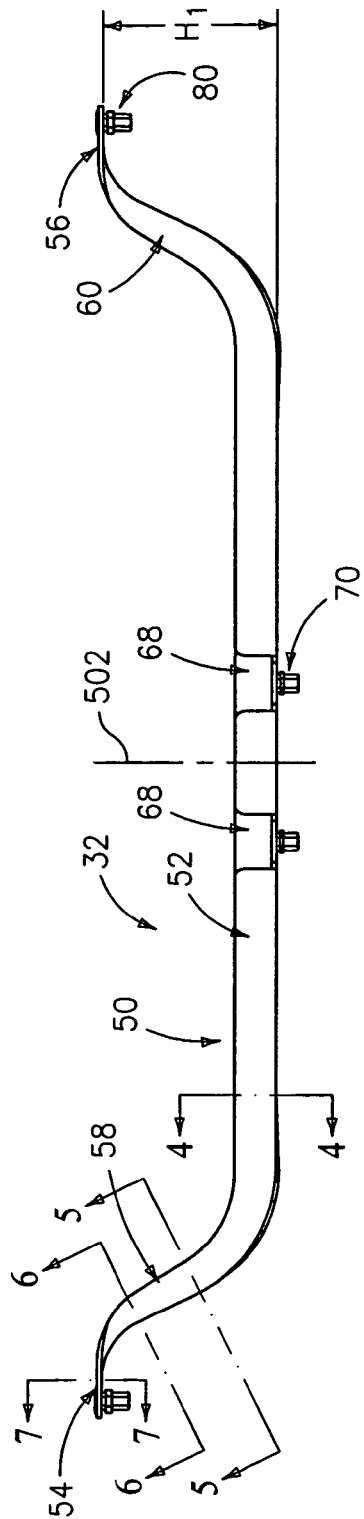
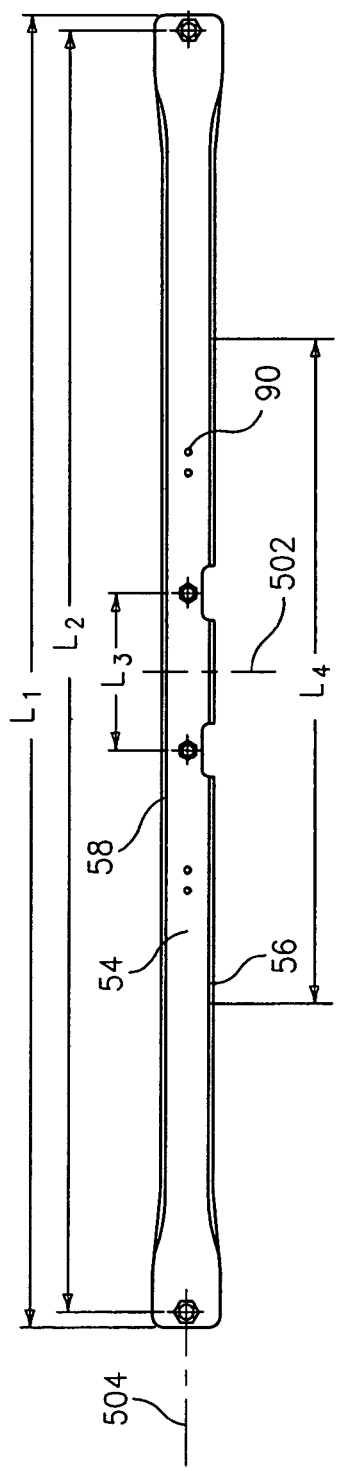

FAN MOTOR SUPPORT

BACKGROUND OF THE INVENTION (1) Field of the Invention

The invention relates to heating ventilation and air conditioning (HVAC) systems. More particularly, the invention relates to fans for such systems.

(2) Description of the Related Art

Fans are ubiquitous in HVAC systems. Many fan configurations exist. A typical electric fan includes a motor having a shaft protruding from one end. A fan assembly is mounted to the shaft so as to be driven by the motor.

SUMMARY OF THE INVENTION

One aspect of the invention involves a fan motor support bracket. A central body portion has a base and first and second sidewalls extending generally upward from the base. The first sidewall has at least one relief for accommodating a mounting ear of the motor. First and second end portions are upwardly offset from the central body portion. First and second transition portions extend respectively between the first and second end portions and first and second ends of the central body portion.

In various implementations, the central body portion, first and second end portions, and first and second transition portions are unitarily formed with each other as a single piece of steel. The first and second end portions may essentially lack sidewalls. The first and second transition portions may each have first and second sidewalls transitioning from the first and second sidewalls of the central body portion and having an outwardly decreasing depth/height.

Another aspect of the invention involves an apparatus having a duct, first and second such fan motor support brackets spanning the duct, a fan motor supported by the first and second fan motor support brackets, and a fan mounted to the fan motor above the first and second fan motor support brackets.

In various implementations, the fan motor may have a case with first, second, third, and fourth such mounting ears. The first and second mounting ears may be accommodated within first and second such reliefs of the first fan motor support bracket and the third and fourth mounting ears may be accommodated within first and second such reliefs of the second fan motor support bracket. A number of threaded fastener moiety pairs may secure the fan motor to the first and second fan motor support brackets. Each threaded fastener moiety pair may include a screw and a nut. There may be third and fourth such fan motor support brackets supporting a second motor driving a second fan.

Another aspect of the invention involves an apparatus including a duct, a pair of motor support brackets spanning the duct, a motor supported by the brackets, a fan engaged to the motor, and a number of fasteners having engaged condition securing the motor to the motor support brackets and a disengaged condition permitting disengagement of the motor from the motor support brackets. The motor may be positioned relative to the support brackets so as to be disengagable therefrom via upward vertical extraction of the motor when the fasteners are in their disengaged condition.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 2 is an inboard side view of a mounting bracket of the system of FIG. 1.

FIG. 3 is a top view of the bracket of FIG. 2.

FIG. 4 is a transverse sectional view of the bracket of FIG. 2 taken along line 4—4.

FIG. 5 is a transverse sectional view of the bracket of FIG. 2 taken along line 5—5.

FIG. 6 is a transverse sectional view of the bracket of FIG. 2 taken along line 6—6.

FIG. 7 is a transverse sectional view of the bracket of FIG. 2 taken along line 7—7.

Like reference numbers and designations in the various drawings indicate like elements.

DETAILED DESCRIPTION

Figure 1:
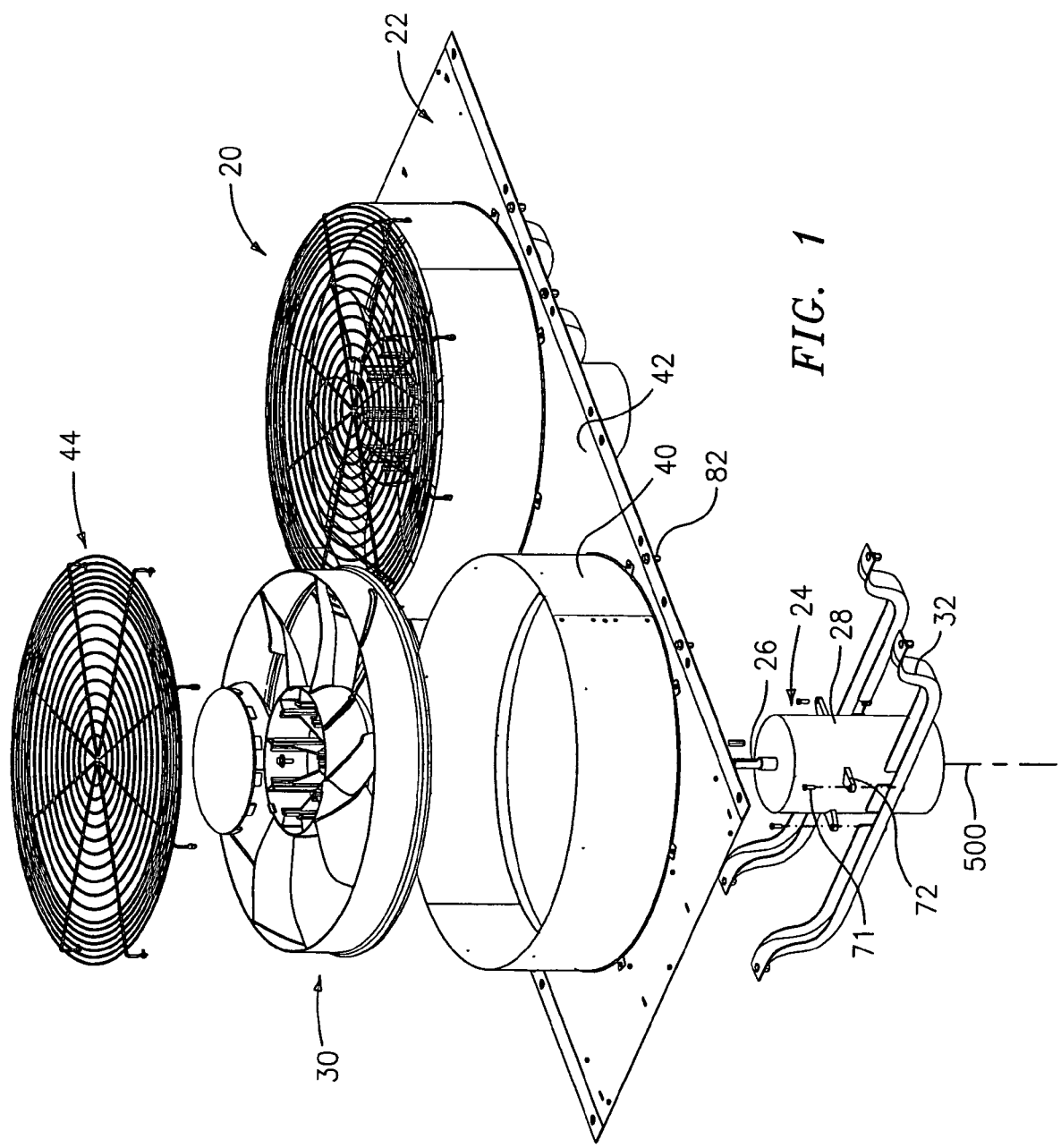
FIG. 1 is a partially exploded view of a pair of electric fan units.

FIG. 1 shows a pair of electric fan units 20 mounted from a duct component 22 of an HVAC system. Each fan unit includes an electric motor 24 having a shaft 26 with a portion protruding from the housing or case 28 containing a stator (not shown). In operation, the motor shaft is driven about a common central longitudinal axis 500 of the fan unit. The fan unit further includes a fan assembly 30 mounted to the protruding portion of the shaft (e.g., held against relative rotation by a key and longitudinally by a screw).

In the exemplary embodiment, each fan unit is mounted to the duct assembly by a pair of mounting brackets 32. In the exemplary embodiment, each fan assembly 30 is concentrically mounted within an annular cylindrical duct extension 40 extending from a proximal end at a flat duct wall 42 to a distal end carrying a grill 44. Other configurations are possible.

FIGS. 2 and 3 show further details of the exemplary brackets 32. The exemplary brackets each include a unitarily-formed metallic member 50 having a central body portion 52, first and second end portions 54 and 56, and first and second transition portions 58 and 60 between respective first and second ends of the central body portion 52 and the end portions 54 and 56. Along the central body portion 52, the bracket is formed as a U-shaped channel with a base 62, an inboard sidewall 64, and an outboard sidewall 66. In section, there is a rounded transition between the base portion 62 and the sidewall portions 64 and 66. The inboard sidewall 64 has a pair of reliefs, recesses or cutouts 68 extending to a flat portion of the base 62. Centrally aligned with the reliefs 68, a captive nut/ferrule 70 (e.g., having a depending faceted portion for driving or wrench engagement) is captured within a circular aperture in the base. For mounting the motor 24 to the bracket, the motor housing/case 28 includes, for each bracket, a pair of apertured motor mounting ears 72 accommodated within the associated reliefs 68. A threaded fastener 74 (e.g., a cap screw) extends through the aperture of each ear and into the associated captive nut/ferrule 70 to secure the motor to its associated pair of brackets. The exemplary metallic member 50 is symmetric across its transverse center plane 502 and, except for the reliefs, across a longitudinal median plane 504.

In the exemplary embodiment, the end portions 54 and 56 are upwardly offset by a height $H_1$ from the central portion (e.g., as measured from the underside of the bracket). Each end portion may bear a captive nut/ferrule 80 in an associated aperture. Threaded fasteners 82 (e.g., cap screws—FIG. 1) may extend through the duct or other environmental structure and into the captive nuts/ferrules 80 to secure the brackets in place.

In the exemplary embodiment, the base portion 62 includes two pairs of apertures 90 on opposite sides of the transverse center plane 502 outboard of the recesses. In the exemplary embodiment, these apertures 90 serve to permit water drainage and/or accommodate anchors/clips for the motor's wiring.

In an exemplary method of manufacture, a strip of sheet metal is cut from larger stock to form a bracket precursor. The precursor is then bent/formed (e.g., via stamping) so as to provide the channel section and the end portion offsets. In the exemplary embodiment, this forming progressively lowers the channel wall thickness in the outboard direction until, at the end portions, the original flat strip form remains (FIGS. 4-7). The various apertures may be drilled, and the reliefs 68 cut. Additional steps may incur machining off the strip corners, deburring strip edges, and the like. One or more layers of paint and/or other coatings may be applied. The captive nuts/ferrules may be installed.

In an exemplary method of use, the brackets of each pair are secured to the environmental structure via the fasteners 82 and captive nuts 80. With this done, a worker may easily lower the motor into place with the ears 72 being accommodated in the associated reliefs 68 to initially position the motor. This may be performed by hand. Then the fasteners 74 may be inserted through the ear apertures and into the nuts 70 and secured thereto via threaded engagement. Thereafter, the fan may be secured to the motor shaft, and remaining assembly details attended to. To disassemble (e.g., for servicing) a reverse of this process may take place with the worker ultimately removing the fasteners 74 and motor and subsequently replacing the repaired motor or installing a new motor as previously described. The insertion of the motor from above, combined with the cooperation of the ears and the reliefs, and combined with use of captive ferrules facilitates ease of installation and removal by a single worker. No additional worker or equipment is needed to hold the motor in place (e.g., contrasted with an upwardly-installed motor). Chances of losing nuts are also reduced or eliminated.

Dimensionally, in addition to the offset height $H_1$ of FIG. 2, FIG. 3 shows the bracket as having an overall length $L_1$, a bracket mounting fastener separation $L_2$, a motor mounting fastener separation $L_3$, and a central body length $L_4$. FIG. 4 shows a central body channel width $W_1$ and height $H_2$. FIG. 7 shows an end portion width $W_2$. A strip thickness T is shown in FIG. 7 and may be generally constant along a length of the bracket.

In exemplary implementations, $H_1$ may be at least 0.05 m (more narrowly, 0.10–0.15 m). $L_1$ may be at least 0.5 m (more narrowly, 0.8 m–1.2 m) with $L_2$ being an exemplary 1.5–5 cm less. $W_1$ may be at least 20 mm (more narrowly, 30–60 mm) and, in an exemplary embodiment, 40 mm. $H_2$ may be an exemplary at least 20 mm (more narrowly, 25–50 mm with an exemplary 30 mm). $W_2$ may be at least 25 mm (more narrowly, 35–70 mm with an exemplary approximately 50 mm). The thickness T may be at least 2 mm (more narrowly 2.5–4.0 mm, with an exemplary 3.0 mm). A sidewall-to-base exterior radius of curvature may be in an exemplary 5–20 mm range, more narrowly, 8–12 mm. The dimensions and shape parameters may be influenced or dictated by a variety of considerations. For example, the length parameters $L_1$ and $L_2$ may be dictated by a pre-existing duct dimension. The offset $H_1$ may be dictated by a desired fan position if motor and fan dimensions are given. However, these parameters may be optimized either manually or via computer simulation to provide desired structural properties. These structural properties include both static and dynamic properties. The static properties may include providing lightness and material economy while providing at least various minimum strengths. The dynamic properties may include vibration resistance/damping, sound minimization (e.g., from airflow disturbance and from vibration), and the like. To the extent that the offset $H_1$ may be optimized along with the position of the mounting ears on the motor, such combination of parameters may be particularly useful to optimizing dynamic performance.

Figure 8:
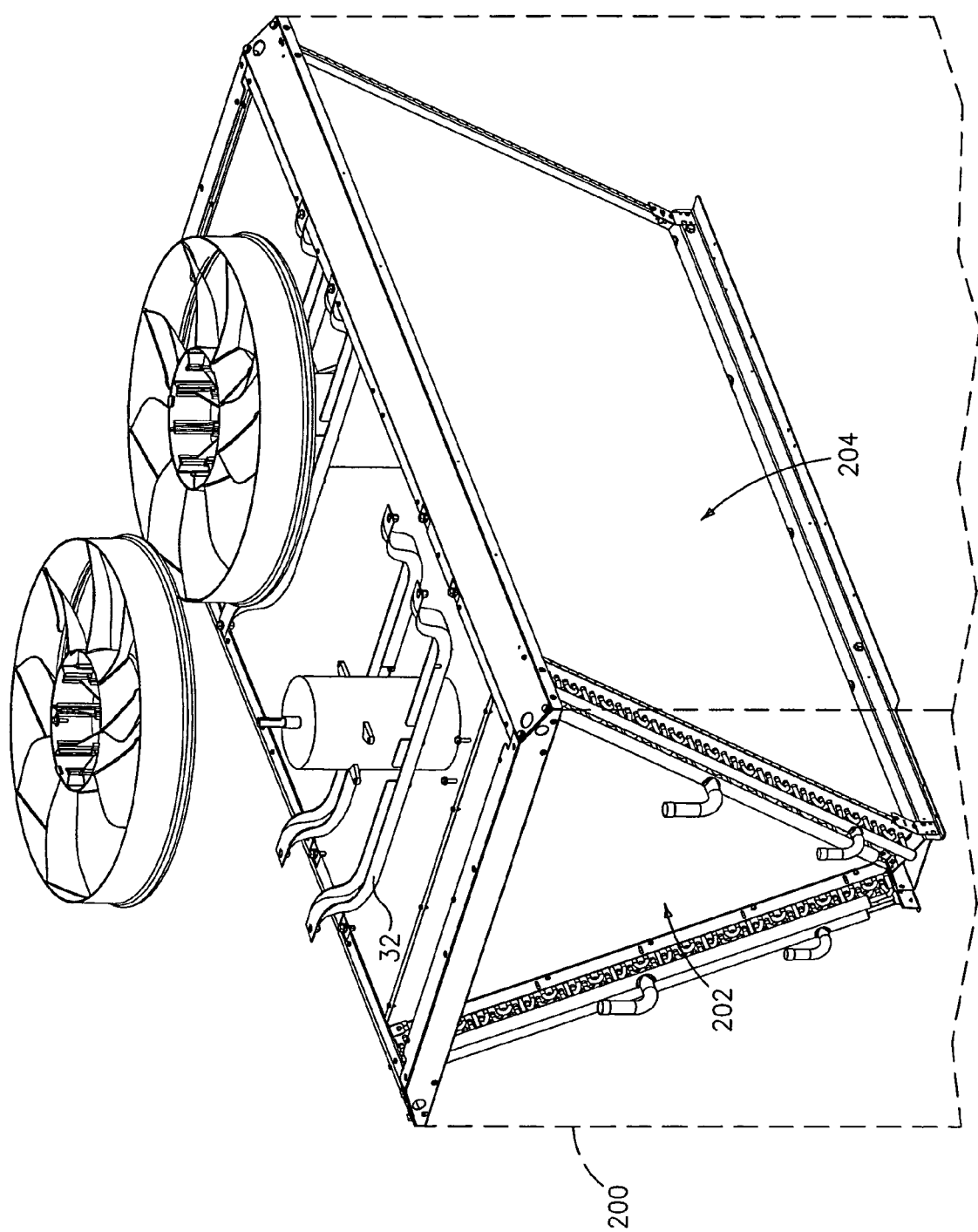
FIG. 8 is a partially exploded view of an alternate pair of electric fan units.

FIG. 8 shows an alternate system in which the brackets 32 support fan motors above a duct 200 containing a pair of heat exchangers 202 and 204 (e.g., condensing coils) oriented at an acute angle to each other and converging away from the fans. The various condenser, fan, and duct geometries, including the angle between the two exchangers, may be optimized to provide advantageous airflow interaction with the coils and thus condenser performance.

One or more embodiments of the present invention have been described. Nevertheless, it will be understood that various modifications may be made without departing from the spirit and scope of the invention. For example, to the extent that the brackets are used in an existing environment or with other existing components (e.g., motors) details of such existing environment or components may influence or dictate details of the implementation. Accordingly, other embodiments are within the scope of the following claims.

The invention claimed is:

1. A fan motor support bracket comprising:
    a central body portion having a base and first and second sidewalls extending generally upward from the base, the first sidewall having at least one relief for accommodating a mounting ear of the motor;
    first and second end portions upwardly offset from the central body portion; and
    first and second transition portions extending respectively between the first and second end portion and first and second ends of the central body portion.

2. The bracket of claim 1 wherein:
    the central body portion, first and second end portions, and first and second transition portions are unitarily formed with each other as a single piece of steel.

3. The bracket of claim 1 wherein:
    the first and second end portions are essentially without sidewalls; and
    the first and second transition portions each have first and second sidewalls transitioning from the first and second sidewalls of the central body portion and having an outwardly decreasing depth.

4. The bracket of claim 1 wherein:
    the first and second end portions each have a flat strip form extending between first and second edges; and
    the first and second transition portions each have first and second sidewalls transitioning from the first and second sidewalls of the central body portion and having an outwardly decreasing depth.

5. The bracket of claim 1 wherein:
    an underside of each of the first and second end portions is offset at least 0.1 m upward of an underside of the base portion;
    a length of the bracket is at least 0.8 m;
    a width of the central body portion is 30–60 mm;
    a height of the central body portion is 25–50 mm;
    a thickness of the central body portion is 2.5–4.0 mm; and a width of the first and second end portions is greater than said width of the body portion and is 35–70 mm.

6. The bracket of claim 1 wherein:
the first and second sidewalls have curved transitions to the base portion having an outer radius of curvature of at least 5 mm.

7. The bracket of claim 1 wherein:
an underside of each of the first and second end portions is offset at least 100 mm upward of an underside of the base portion.

8. The bracket of claim 1 wherein:
there are first and second such reliefs for respectively accommodating first and second such mounting ears.

9. The bracket of claim 1 further comprising:
at least one motor mounting nut captured in an aperture in the base and having a depending faceted driving portion.

10. The bracket of claim 1 further comprising:
first and second bracket mounting nuts respectively captured in first and second apertures in the first and second end portions and each having a depending faceted driving portion.

11. An apparatus comprising:
a duct;
first and second fan motor support brackets according to claim 1 spanning the duct;
a fan motor supported by the first and second fan motor support brackets; and
a fan mounted to the fan motor above the first and second fan motor support brackets.

12. The apparatus of claim 11 wherein:
the fan motor has a case with first, second, third, and fourth such mounting ears;
the first and second mounting ears are accommodated within first and second such reliefs of the first fan motor support bracket; and
the third and fourth mounting ears are accommodated within first and second such reliefs of the second fan motor support bracket.

13. The apparatus of claim 11 further comprising:
a plurality of threaded fastener moiety pairs securing the fan motor to the first and second fan motor support brackets.

14. The apparatus of claim 11 further comprising:
third and fourth fan motor support brackets according to claim 1 spanning the duct parallel to and level with the first and second fan motor support brackets;
a second fan motor supported by the first and second fan motor support brackets; and
a second fan mounted to the second fan motor above the third and fourth fan motor support brackets.

15. An apparatus comprising:
a duct;
a pair of motor support brackets spanning the duct;
a motor supported by the pair of motor support brackets;
a fan engaged to the motor; and
a plurality of fasteners having an engaged condition securing the motor to the motor support brackets and a disengaged condition permitting disengagement of the motor from the motor support brackets, wherein:
each of the motor support brackets has, along a majority of its length, a generally upwardly open U-shaped cross-section; and
the motor is positioned relative to the support brackets so as to be disengageble therefrom via upward vertical extraction of the motor when the fasteners are in their disengaged conditions.

16. An apparatus comprising:
a duct;
a pair of motor support brackets spanning the duct;
a motor supported by the pair of motor support brackets;
a fan engaged to the motor; and
a plurality of fasteners having an engaged condition securing the motor to the motor support brackets and a disengaged condition permitting disengagement of the motor from the motor support brackets, wherein:
each of the motor support brackets has:
a central body portion having a base and first and second sidewalls extending generally upward from the base, the first sidewall having at least one relief for accommodating a mounting ear of the motor;
first and second end portions upwardly offset from the central body portion; and
first and second transition portions extending respectively between the first and second end portion and first and second ends of the central body portion; and
the motor is positioned relative to the support brackets so as to be disengageble therefrom via upward vertical extraction of the motor when the fasteners are in their disengaged conditions.

\* \* \* \* \*